United States Patent [19]
Turner

[11] 3,774,555
[45] Nov. 27, 1973

[54] COMPACT INCINERATOR

[75] Inventor: Abner B. Turner, Greensburg, Pa.

[73] Assignee: Westinghouse Electric Corporation, Pittsburgh, Pa.

[22] Filed: Jan. 31, 1972

[21] Appl. No.: 221,991

[52] U.S. Cl. .................... 110/8 R, 110/8 A, 110/11, 110/15
[51] Int. Cl. ............................................. F23g 5/12
[58] Field of Search .................... 110/8 R, 8 A, 8 E, 110/10, 11, 15, 18 E

[56] References Cited
UNITED STATES PATENTS

| | | | |
|---|---|---|---|
| 3,648,630 | 3/1972 | Hobbs et al. | 110/8 |
| 3,491,707 | 1/1970 | Bakker | 110/8 |
| 3,362,887 | 1/1968 | Rodgers | 110/11 X |
| 3,027,445 | 3/1962 | Johnson | 110/8 X |
| 2,932,713 | 4/1960 | Powers | 110/8 X |
| 3,471,369 | 10/1969 | Cox et al. | 110/10 X |

Primary Examiner—Kenneth W. Sprague
Attorney—A. T. Stratton et al.

[57] ABSTRACT

A compact incinerator including a longitudinally extending furnace having a solids inlet and residue outlet, and heaters disposed around the furnace peripheral surface. A conveyor located inside the furnace moves solid matter from the inlet along the furnace length and the heaters simultaneously cause conbustion of solids during such movement prior to discharge as ash through the outlet. Preheated 0air supplied to the furnace aids combustion and carries away volatile gases generated during the combustion process. To assure complete burning of all gases, the gases and air are circulated through an afterburner mounted on the furnace prior to discharge to the atmosphere.

5 Claims, 4 Drawing Figures

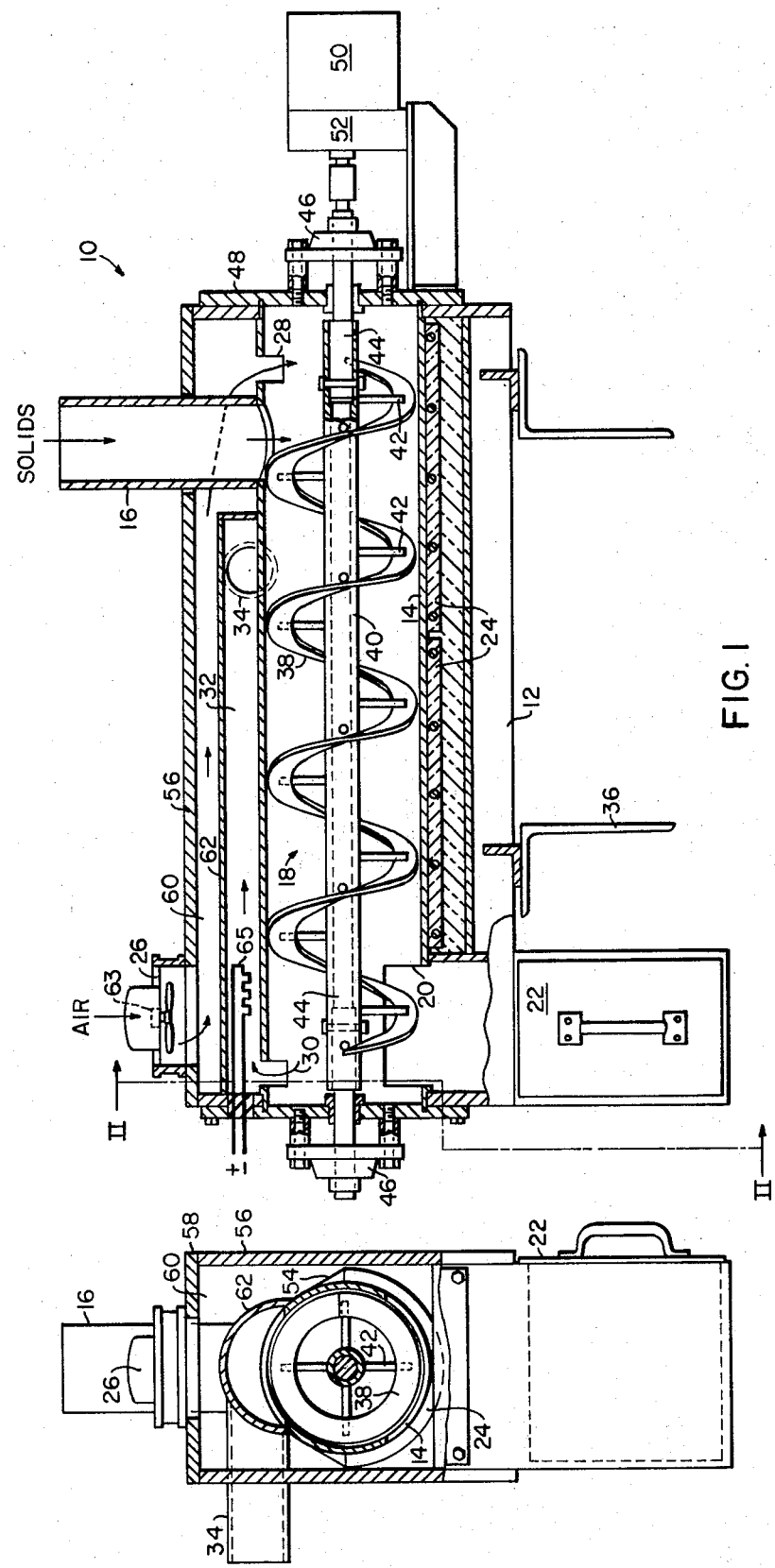

COMPACT INCINERATOR

BACKGROUND OF THE INVENTION

The invention described herein relates to waste-water treatment apparatus and more particularly to a compact incinerator designed to dispose of solid matter separated from liquid in a sewage or other solids processing system.

The products resulting from treatment of organic or inorganic materials in industrial and commercial processes, often include a liquid having solid components therein which cannot be discharged directly to a stream or river.

As a result, many different processes have been developed for disposing of the solids. One well known method involves incineration wherein the solids are burned and the ash residue disposed of in a conventional manner. Incinerators are extensively used in large industrial operations and the more recent development of small sewage disposal plants of the type used on boats or small ships, for example, have concurrently led to designs of low volume incinerators. To achieve economy in operation, known small sewage plants store solid matter which then is burned in an an incinerator at infrequent intervals each day.

The disadvantages in such designs are that the solids compact and lose moisture and the aggregate tends to solidify to a degree such that particle separation which is necessary for efficient combustion does not take place. Subsequent to burning, the residue then comprises ash which may be disposed of but the incompletely burned solids must be reburned or otherwise reduced to a state where they may properly be discarded. Further, to assure complete combustion of the solid products, the burners could of course be operated on a 24 hour basis but doing so requires relatively large storage facilities for the fuel where space is at a premium. Also, the constant application of heat to the incinerator results in high cost and therefore uneconomical operation because little or no solid matter would be run through the incinerator during off peak hours.

BRIEF SUMMARY OF THE INVENTION

A compact incinerator which exposes solid particulate matter to a temperature and for a time necessary to effect complete combustion of the solids as they are advanced by a conveyor along the incinerator length, and then discharges the residue to a collector. The incinerator includes integral structure which preheats air used to support combustion and to carry both the burned and unburned gaseous products of combustion to an afterburner located in the incinerator outlet. In a preferred form, the unburned gases may be consumed by the afterburner which derives its heat from the incinerator or from a separate heater located in the gas flow path to the atmosphere. It will occur to those skilled in the art that different types of solids conveying devices may be used for moving the solid constituents through the incinerator and for burning or chemically absorbing the gases discharged to the atmosphere.

It therefore is an object of the invention to provide an incinerator operating at a temperature chosen to correspond with the time required to burn solid matter as it moves along the incinerator length.

Another object of the invention is the provision of an incinerator which utilizes its radiated heat to preheat air introduced into the incinerator for supporting combustion and for carrying away gases resulting from the combustion process.

Still another object of the invention is the provision of an incinerator which consumes any remaining volatile gases not burned in the incinerator prior to their discharge to the atmosphere; and Another object of the invention is to provide an incinerator of compact design which is efficient and economical to construct and operate.

BRIEF DESCRIPTION OF THE DRAWING

While the specification concludes with claims particularly pointing out and distinctly claiming the subject matter of the invention, it is believed the invention will be better understood from the following description taken in conjunction with the accompanying drawing, wherein:

FIG. 1 is a view in elevation, partly in section, of the incinerator of this invention;

FIG. 2 is a side view of the incinerator illustrated in FIG. 1;

DETAILED DESCRIPTION OF THE INVENTION

Figure 3:
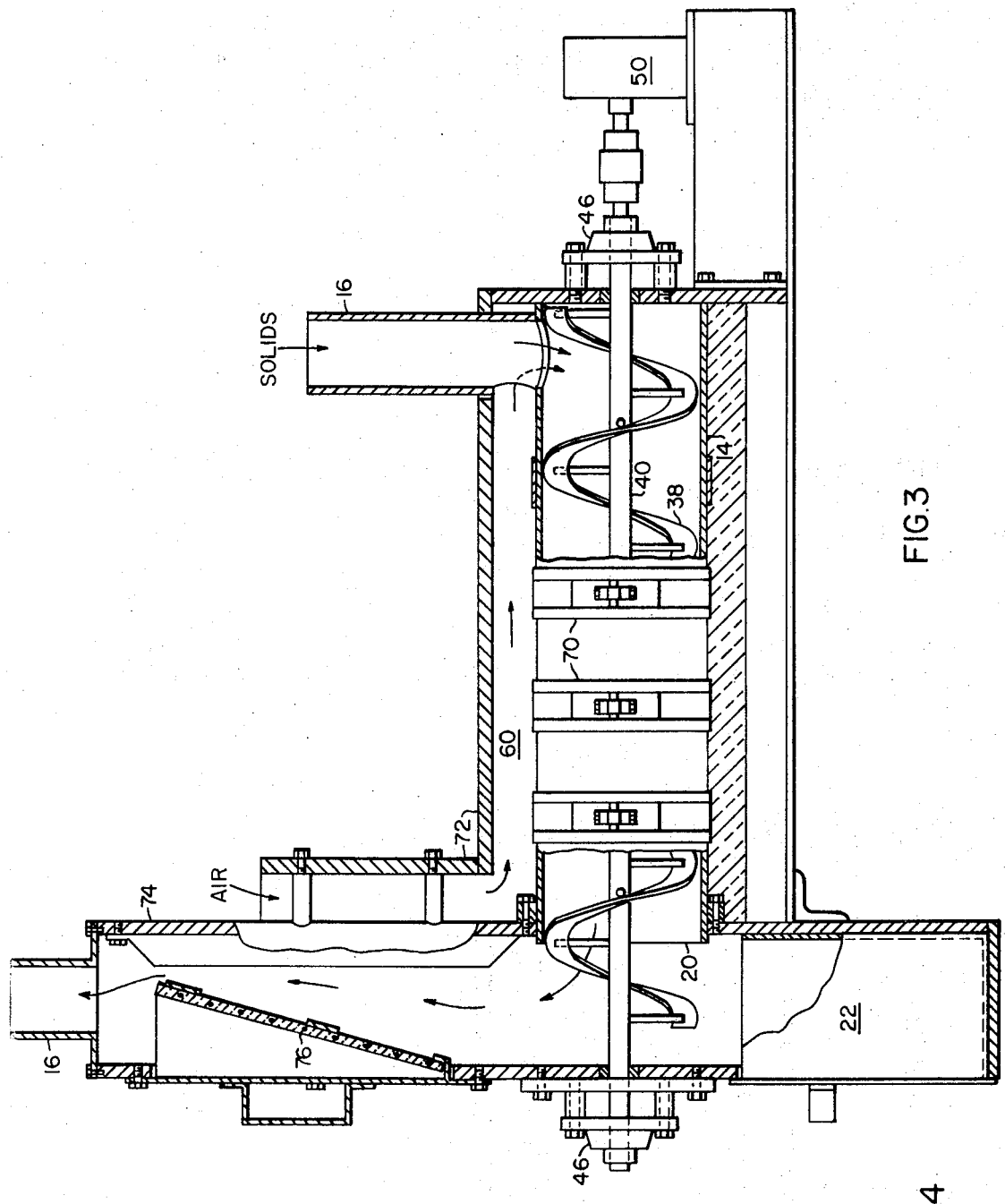
FIG. 3 is a view in elevation, partly in section, of a modification of the incinerator shown in FIG. 1.

Referring now to the drawings wherein like reference characters designate like or corresponding parts throughout the several views, there is shown in FIG. 1, an incinerator 10 designed to burn solid particulate matter preferably of the kind which is separated from a liquid during a liquid treatment operation. The incinerator is mounted on a base 12 which supports a furnace 14 having a solids inlet 16 which deposits solid matter on a screw type conveyor 18. The conveyor is designed to move the solids longitudinally through the furnace prior to discharge through an outlet 20 to an ash collector 22. Combustion of the solids is accomplished through the medium of electrically operated heaters 24 preferably disposed on the lower half of the furnace outer peripheral surface. To support combustion, air introduced through an inlet 26 flows along the length of the furnace, as shown by the arrows, to be preheated prior to entering the furnace through an inlet 28. During its course of travel through the furnace, the air serves the dual function of supporting combustion and carrying away gaseous products of combustion, including any volatile gases not burned in the furnace. This gas mixture then flows through outlet 30 into a gas burning space or afterburner 32 before being discharged through the furnace outlet 34 to the atmosphere.

Considering the design in greater detail, the base 12 may be supported by stanchions 36, for example, which are mounted on or adjacent other components in the waste-water treatment system. The furnace 14 is of cylindrical configuration with both the solids inlet 16 and air inlet 28 being located on one end to permit solids and air flow in the same direction longitudinally of the furnace prior to being discharged through their respective outlets 20 and 30.

The screw-type conveyor 18 includes a helical metallic strip 38 welded or otherwise secured to the tube 40 by radially extending brackets 42. As shown, its inner peripheral edge is spaced a substantial distance from tube 40 while its outer edge forms a close fit with the round inner walls of the furnace. As the furnace is heated to about 800° to 1,000°F, depending on the solids being burned, the parts will thermally grow such that the strip outer edges will just barely contact the furance walls and thus effectively move the solids along the furnace length. The opposite ends of hollow tube 40 are supported by a pair of shafts 44 which rotate in bearings 46 disposed in an end plate 48 attached to opposite sides of the furnace. Rotation of the helical strip conveyor 38 is accomplished by a motor 50 and gear reducing unit 52 which is directly coupled to the shaft 44.

Heat for combustion purposes may be supplied to the furnace in anyone of a number of different ways and in the embodiment shown, the heaters 24 are of a semicylindrical shape and are attached to the lower half of the furnace by straps 54, FIG. 2, or other conventional securing means. The heaters are commercially available and generally consist of a multiplicity of conductors embedded in a ceramic or asbestos-like element designed to conform to the furnace outer surface. Heat therefore is transmitted to the combustion space by conduction through the furnace walls.

In order to acquire efficient combustion economically, the incoming air is preheated by the residuum of heat from the furnace. This is accomplished by enclosing the furnace in heavy steel plates or insulating plates such as transite, 56 and 58 to form a plenum chamber 59. Since the air inlet 26 is located on the opposite end from the solids inlet to the furnace, the incoming air must flow longitudinally through the plenum chamber prior to being introduced into the furnace through inlet 28. In so doing, the air is preheated by the furnace residual heat therefore eliminating the need to provide a separate heat energy source which otherwise would be required to heat the air to help support the combustion process. The heaters 24 are chosen to raise the furnace temperature to approximately 1,000°F and the heat thus imparted to the furnace atmosphere, combined with the preheated air flowing therethrough, helps assure complete reduction of the solid matter to ashes.

During the course of flow through the furnace, preheated air also purges the furnace of all volatile and non-volatile gases including those which have not been consumed during the solids burning process. The remaining air, combustion products volatile and non volatile gases are then discharged to an afterburner chamber 32 which is formed by the outer walls of the furnace and a semi-spherical element 62 having its ends placed in direct contact therewith. Since the temperature in furnace 14 is maintained at a relatively constant temperature between about 800° and 1,000° F, it is apparent that the temperature in afterburner chamber 32 ranges between about 600° and 800°F. This temperature is sufficient to burn most gases discharged thereinto from the furnace 14. Should complete combustion of all gases and elimination of odors at the discharge outlet be desired, a supplemental heater 63 may be energized to raise the temperature in chamber 32 to about 1,400° F. Upon completion of the total combustion process, the remaining air and gaseous combustion products flow to the atmosphere, or to carbon filters, through outlet 34. In some installations, natural convection currents may be relied on for moving the air through the furnace and the associated chambers prior to discharge to the atmosphere. However, it may be desirable to mount a fan or air blower 63 on the inlet 26 to positively induce the circulation of the air through the incinerator.

In operation, heating elements 24 heat the furnace to 800°–1,000° F depending on the character of solids to be consumed, at which time solids may be introduced into the furnace through inlet 16. Simultaneously, preheated air flows through inlet 28 to the furnace for providing the oxygen necessary for combustion purposes. As the solids are moved longitudinally or axially of the furnace by the rotating helical conveyor, steam and gases are driven from the solids and the remaining solid particles are then completely burned to provide an ash which is then deposited by the conveyor in ash container 22. The gaseous products of combustion including air and those gases not burned in the furnace are then circulated through high temperature chamber 32 to help assure complete combustion of the gases prior to their discharge through outlet 34 to the atmosphere. The residence time of solids in the furnace desirably should correspond with temperature to achieve efficient and economical operation. The type of solids being burned determines the furnace temperature and in the case of sewage, the desired temperature range is 800° to 1,000° F. For a furnace combustion space of about 680 cu. in., i.e. 24 inches long and 6 inches diameter, the helical conveyor should rotate at one-half rpm, thus providing a residence time of 12 minutes in the furnace. This illustrative time-temperature relationship assures complete reduction of the solids to ashes.

Since provision is made for consuming unburned gases in the afterburner chamber, the design of furnace herein provides a relatively uniform temperature in the chamber of about 600°–800° F, and 1,200°–1,400° F when supplemental heater 63 is used, such temperature being at or above that necessary to burn any gases discharged from the combustion chamber.

Figure 4:
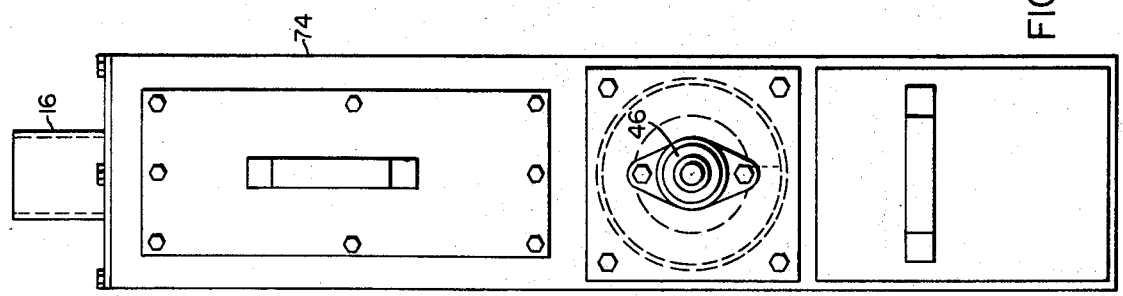
FIG. 4 is a side view of the incinerator of FIG. 3.

The modification illustrated in FIGS. 3 and 4 is essentially the same as that shown in FIG. 1 except for the means for imparting heat to the furnace and in the air circulating arrangement. As shown, instead of utilizing ceramic types of heating elements, strip heaters 70 are mounted on the outside peripheral surface of the furnace and upon being energized, transmit by conduction heat through the furnace wall into the combustion space. In both embodiments disclosed herein, appropriate and well known temeprature sensing elements may be located inside the furnace and connected to control means for energizing the space heaters to thereby maintain the temperature within the furnace at predetermined levels. As in the embodiment of FIG. 1, the space heaters may be located and positioned only partially around the furnace and their spacing along the furnace length may be varied to provide the proper temperature profile for obtaining the most efficient operation and maximum combustion of the solids material which is moved therethrough.

To provide preheated air for combustion, plates 72 are attached to the top and sides of the furnace and spaced therefrom to provide a chamber or passageway 60 through which air flows from the atmosphere to the furnace inlet 16. In this embodiment, inlet 16 serves to channel both air and solids into the combustion chamber. In operation, heat is radiated outwardly into chamber 60 so that as the incoming air traverses the chamber, it passes in heat exchange relationship with the furnace walls and thus becomes preheated to the desired degree. After the air circulates through the furnace, it is discharged into an exhaust stack 74 having a heating element 76 positioned therein. The element is preferably mounted at an angle to the axis of the stack so that air and gaseous products of combustion leaving the furnace are required to flow across the heating element and thus assure combustion of any gases which have not been consumed in the furnace. After the gases are burned, the air is then discharged to the atmosphere in a conventional manner.

The draft provided by the exhaust gases blowing out the stack usually is more than sufficient for moving preheated air through the combustion chamber. Control over preheated air velocity may be accomplished by locating a damper in the exhaust stack in a conventional manner. By utilizing this kind of arrangement, the furnace is assured of having the desired quantity and temperature of air which is necessary to aid in the decomposition and combustion of the solid particles as they are moved through the furnace by the helical conveyor 38.

In view of the above it will be apparent that many modifications and variations in the invention may be made in light of the above teachings. It therefore is to be understood that within the scope of the appended claims, the invention may be practiced otherwise than as specifically described.

I claim:

1. An incinerator for burning solid material comprising:
   a furnace including a combustion chamber having heating means on the walls thereof for providing heat for combustion, an inlet for solid particulate matter and an outlet for discharge of the solid products of combustion;
   a conveyor in said furnace arranged to move said solid matter longitudinally toward the outlet, said conveyor comprising a shaft extending the length of said combustion chamber and having its ends positioned in bearings disposed on opposite end walls of the furnace, a helically formed strap attached to opposite ends of the shaft which moves the solid matter from the inlet along the combustion chamber length to said outlet;
   drive means associated with said furnace for operating the conveyor at a speed which corresponds to the residence time required for solids to remain in the furnace to assure complete combustion of said solids;
   air preheating means on said furnace for raising the temperature of air supplied to said furnace to support combustion, and a gas outlet to discharge gases including the excess air, products of combustion and gases generated during the combustion process in the furnace; and
   after-burner means on said furnace connected to the gas outlet, said after-burner means comprising a housing mounted on said furnace, the inner wall surfaces of said housing defining with the furnace outer walls a gas combustion chamber which extends substantially the complete length of the furnace and circumferentially encompasses a part of the furnace upper wall surface, the arrangement being such that combustion gases discharged through the furnace gas outlet, pass through the gas combustion chamber which helps consume gases not burned in the furnace during the combustion process.

2. The incinerator according to claim 1 wherein supplemental heating means is positioned in said gas combustion chamber to raise the temperature therein to a level sufficient to assure combustion of all gases and elimination of odors which otherwise would be discharged to the atmosphere.

3. The incinerator according to claim 1 wherein said afterburner means comprises a housing enclosing at least a portion of said furnace to form a gas combustion chamber therebetween which acquires its heat by conduction through the walls of the furnace and means connecting the gas outlet from said furnace with the chamber so that unburned gases from the furnace may be consumed therein prior to discharge to the atmosphere, and
   said preheating means comprises an enclosure over said housing to form therebetween a space through which the incoming air to the furnace flows to be preheated prior to its entry into the furnace.

4. The incinerator according to claim 1 wherein said heating means comprises strip heaters having their inner surface in direct contact with the outer surface of said furnace and being of a size sufficient to impart heat to said furnace to completely burn said solids during their residence time in the furnace.

5. The incinerator according to claim 1 wherein an exhaust stack communicating with the furnace gas outlet is mounted on the end of said furnace; and
   said afterburner means further includes a heating element in said stack over which the discharge gas from the furnace flows for burning any unburned gases from the furnace before being vented to the atmosphere.

* * * * *